United States Patent Office 3,544,666
Patented Dec. 1, 1970

---

3,544,666
METHOD FOR PRODUCING A HEAT INSULATING REFRACTORY USING CALCINED GEYSERITE HAVING A HIGH TRIDYMITE CONTENT
Masatoshi Shiota and Taizo Kato, Yokohama, and Hideji Numata, Kamakura, Japan, assignors to Asahi Glass Co., Ltd., Tokyo, Japan
No Drawing. Filed Jan. 4, 1968, Ser. No. 695,556
Claims priority, application Japan, Jan. 10, 1967, 42/1,552; May 4, 1967, 42/28,056
Int. Cl. C04b 35/14
U.S. Cl. 264—66                                    4 Claims

ABSTRACT OF THE DISCLOSURE

Heat-treated geyserite, in which more than 60% of silica is composed of tridymite, is blended with other raw refractory materials in such a way that the heat-treated geyserite will amount to 20 to 90%, by weight percent, in the total raw refractory materials as a refractory material. Grain hull ash, in which the greater part of silica is tridymitized, is also effectively used jointly with the heat-treated geyserite, if circumstances require. The heat-treated geyserite is combined with light weight chamotte, and a binder such as clay, water glass, aluminum monophosphate and equivalents, tempered with water, pressed into shape, and either fired to develop a ceramic bond or heat treated at lower temperatures to develop a chemical bond. The fired shape can be used as an insulating refractory.

BACKGROUND OF THE INVENTION

Field of the invention

The present invention relates to a method for the production of heat insulating refractory products and more particularly, to a method for the production of heat insulating refractory products using heat-treated geyserite as a raw refractory material.

Description of the prior art

As methods for the production of heat insulating refractory products, there are utilized various methods, in general, for instance, (1) method of mixing combustible material into raw materials, (2) method of mixing sublimatible materials, (3) chemical foaming process, (4) clay-foam process (process of mechanically foaming clay slurry previously mixed with foaming agent), (5) water-foam process (process of previously making aqueous solution only by means of aqueous solution of foaming agent and adding the resulting aqueous solution to the slurry), (6) process of utilizing light weight materials, etc.

Of these methods the processes of the above-mentioned (2) to (5) have many technical difficulties in stabilizing the froth (or foam) and effecting homogeneous foaming and accordingly are not suitable for obtaining homogeneous porous refractory products. Moreover, these methods require complicated steps and processes.

Methods carried out in general at present are those shown above in (1) and (6). However, in the method of (1), the brick must be re-formed by grinding process because of the fact that the shape of the produced brick is remarkably distorted after firing. Further, in case of utilizing light weight material in (6), such materials are often used as kieselguhr, expanded shale, vermiculite, asbestos, light weight chamotte and the like, and sometimes bubbles (hollow particles) such as aluminous substances may be used.

These materials may previously be heat-treated, if required or may sometimes be used intact.

On the other hand, for the insulating refractory products there are required besides excellent heat insulating effect, excellent properties in respect of mechanical strength, thermal stability, and resistance against collosion and erosion at high temperatures.

Nevertheless, most insulating refractory products are not so satisfactory in these various properties in general.

For instance, the heat insulating refractory product, wherein kieselguhr is used, has large expansion and shrinkage, i.e., a large dimensional change due to heat, the texture of the said product is weakened by heat, and therefore not suitable for use above 1,000° C. and its strength is below 30 kg./cm.$^2$. The insulating refractory product, in which vermiculite, expanded shale and the like are used, does not have sufficient thermal stability and mechanical strength at higher temperatures. Moreover, if the heat insulating refractory product, wherein hollow particles are used, is intended for improvement in heat insulating property, the product will have little mechanical strength whereas is intended for increase in mechanical strength, it will have insufficient heat insulating properties.

That is, in case of producing heat insulating refractory products the selection of raw refractory material is generally important.

[Bumpei Yoshiki: "Engineering of Refractory Products," pp. 506 to 512, published on Sept. 15, 1962 by The Giho-do, Limited, Tokyo, Japan.]

BRIEF SUMMARY OF THE INVENTION

The present inventors have executed numerous mechanical and physical experiments and laborious studies in regard with these problems which resulted in the successful accomplishment of the present invention.

That is, the present inventors have found a method for the production of heat insulating refractory product having various excellent properties as described above by using porous geyserite as a raw insulating refractory material, treating the said geyserite with heat to tridymitize more than 60% of silica of the geyserite and mixing the heat-treated geyserite as a raw refractory material with other raw refractory materials in such a way that the said heat-treated geyserite amounts to 20 to 90% in raw refractory materials.

The inventors have further found that the production of excellent heat insulating refractory products can be obtained by using grain hull ash, in which the greater part of silica is likewise tridymitized, jointly with heat-treated geyserite.

An object of the present invention is to provide light weight insulating refractory products having an excellent heat insulating property even at higher temperatures.

Another object of the invention is to provide insulating refractory products having an excellent mechanical strength.

Still another object of the invention is to provide insulating refractory products substantially free from dimensional change such as thermal expansion, shrinkage and the like due to heating.

A further object of the invention is to utilize geyserite effectively, which is deposited in large quantities but has not yet been fully utilized industrially.

Other objects, features and advantages of the present invention will become apparent as the description proceeds in the following.

DETAILED DESCRIPTION OF THE INVENTION INCLUDING PREFERRED EMBODIMENTS

Geyserite used as a refractory material in the present invention is also called siliceous sinter and is said to be a hot spring deposit produced in such a way that in general, hydrated silicic acid compressed in the deep place of the earth gushes out onto the surface of the earth by the hot spring action and is cooled, subjected to reduction of pressure and thereby deposited. In most cases, the geyserite is composed of 80 to 98% of $SiO_2$ and contains up to ca. 10% of $H_2O$ and also $Al_2O_3$, $Fe_2O_3$, $MnO_2$, CaO, MgO, $Na_2O$, $K_2O$, $SO_3$ and others in small quantities. Further, the geyserite is generally composed of amorphous silica, however, that containing cristobalite in part may be found.

The geyserite is preferably produced in porous quality and exists abundantly as resource in Japan belonging to a volcanic zone, and besides deposited in various places in the world.

Several examples of the analytical values of geyserite are shown in the following:

The grain ash described here is rice hull ash, however, any grain ash such as wheat and barley hull ash is also usable. The ash is made by burning hulls, epidermis or expidermis. In the present specification the explanation is made with reference to ash made by firing rice hull as an established fact.

The grain hull must sufficiently be fired. That is, only when the grain hull is merely piled on the ground and fired, incomplete combustion will take place in part and consequently, the ash will contain carbon and moreover, silica of the ash will not be tridymitized.

In general, the grain hull is completely fired in a suitable combustion furnace such as heating apparatus (or plant), rotary kiln or the like, or is piled up in a large

TABLE 1.—CHEMICAL ANALYSIS OF GEYSERITES

|  | $H_2O$ (volatiles) | $SO_3$ | $SiO_2$ | $Al_2O_3$ | $Fe_2O$ | CaO | MgO | $K_2O$ | $Na_2O$ | Soluble $SiO_3$ |
|---|---|---|---|---|---|---|---|---|---|---|
| Makizono-geyserite 1* | 7.01 | Tr. | 90.07 | 0.94 | 1.08 | 0.66 | Tr. | | | 51.12 |
| Makizono-geyserite 2 | 5.38 | | 93.63 | 0.02 | 0.10 | Tr. | | | | 95.33 |
| Makizono-geyserite 3 | 6.95 | Tr. | 87.54 | 2.61 | 2.45 | 0.85 | 0.11 | | | 42.39 |
| Iceland-geyserite | 1.50–14.50 | 0–2.49 | 79.34–94.40 | 0.69–10.96 | 0.17–2.68 | 0–1.11 | 0–1.06 | 0–1.66 | 0–3.55 | |

* Kagoshima Prefecture, Japan.

In the present invention, the geyserite is heat-treated. That is, the greater part of the silica of the geyserite is tridymitized by heat-treatment. The geyserite is pulverized preferably finely pulverized.

In order to tridymitize the silica in the pulverized geyserite, an alkali constituent or salt containing alkali is generally used as an addition material. That is, the geyserite is fired in the presence of $K_2SO_4$, $K_2CO_3$, $Na_2SO_4$, $Na_2CO_3$, feldspar, mica or others.

Alkali constituent is preferred to be added to the geyserite positively, however, when geyserite containing alkali is used, addition of alkali constituent will not inevitably be needed.

The heat-treating temperature is in the range of between 500° C. and 1,200° C., and preferably between 700° C. and 1,100° C.

In case the quantity of the additive such as alkali, which promotes the tridymitization of silica, is larger, the heat-treating temperature may be lower in general. The preferable quantity of alkali is 0.3 to 7% by weight of geyserite calculated as oxide.

By such heat-treating, more than 60% of silica, preferably more than 85% of silica (according to X-ray analysis) of the geyserite is tridymitized. This geyserite is referred to as heat-treated geyserite in the present specfication.

Even if the heat-treated geyserite is treated in the above-mentioned range of temperatures, it will remain in a porous state and will not sinter. Accordingly, the heat-treated geyserite can easily retain this state when it is pulverized.

The particle size of the heat-treated geyserite is determined according to the use, and pulverized heat-treated geyserite above 28 mesh (Tyler Standard screen sieve) may be used as an aggregate. In most cases more than 80% of the said geyserite is used below 200 mesh, preferably more than 50% thereof is used below 325 mesh.

These heat-treated geyserites used in the present invention have a bulk density of 0.5 to 1.2 grams/cm.$^3$ (the value shows the weight of the geyserite, with which the measuring cylinder is filled under shaking without applying pressure).

In the present invention the heat-treated geyserite occupies generally 30 to 90% of the raw refractory materials. On the other hand, grain hull ash is used in the range of 10% and 65% of the raw refractory materials as a means for making the present invention more effective. In this case, more than 60% of $SiO_2$-content of the grain hull ash is also composed of tridymite. In case of using this grain hull ashes in the present invention, the amount used of the heat-treated geyserite may be 20% of the raw refractory materials at the minimum. That is, a part of the heat-treated geyserite is replaced by the said grain hull ash.

heap and fired. In case of need the grain hull is fired under the positive introduction of oxygen or air. Further, the grain hull may be sometimes fired under the addition of alkali constituent such as potassium, sodium, and the like.

The grain hull ash can be mixed with the refractory materials up to 65%, but the use of the grain hull ash above 65% decreases the specific character of the heat-treated geyserite, needs a large amount of grain hull and is undesirable. In fact, the grain ash is reduced to about ¼ to ⅕ of the weight of the grain hull after combustion.

The heat-treated geyserite composed of tridymite in the invention has an excellent resistivity to the change in temperature and does not cause volume change due to the transition of silica at higher temperatures. Accordingly the texture of the refractory product, in which these materials were used, is stable and not weakened and furthermore the refractory product itself is not lowered in the mechanical strength. Moreover, the heat-treated geyserite can also sufficiently be used as insulating refractory material from the viewpoint of fireproofness or fire resistance and corrosion resistance.

A part of these heat-treated geyserites can be replaced by the grain hull ash and it has been found that the grain hull ash has an effect similar to that of the heat-treated geyserite in use in combination with heat-treated geyserite.

Examples of desirable use of heat-treated geyserite and grain hull ash in the present invention are as follows:

Total amount, percent by weight
(1) Heat-treated geyserite 30–90% ⎫
(2) Heat-treated geyserite 20–80% ⎬ _____ 30–90
    Grain hull ash 10–65%. ⎭
(3) Heat-treated geyserite 20–55% _____ 45–75
    Grain hull ash 20–55%.

The heat insulating refractory product according to the invention becomes a product of somewhat different properties by the selection of raw refractory materials such as heat-treated geyserite, grain hull ash and the like. For instance, in case bricks of higher heat-insulating property are required, light weight heat-treated geyserite, light weight grain hull ash and other light weight refractory materials are used in large quantities, and in case heat-insulating refractory brick of higher strength are required, heat-treated geyserite is used in larger quantities.

The main raw material in the present invention is heat-treated geyserite, or heat-treated geyserite and grain hull ash, and other refractory materials as mentioned below are generally used in part.

For example, the most useful material is light weight chamotte, and this light weight chamotte is generally used in a particle size diameter of below 5 mm.

The chamotte used in general is composed of 30–50% of $Al_2O_3$ and 50–70% of $SiO_2$ and has a refractoriness above Seger cone number 31. Further, the said chamotte is preferably screened into 30–60% of particles of 2–5 mm., 30–50% of particles of 2–0.5 mm. and 5–25% of particles below 0.5 mm.

Besides this, refractory materials containing $SiO_2$ are used in general, Silimanite, kyanite, kieselguhr, bentonite, vermiculite, shale, hollow particles or the like are also used. Raw clay is also used. The raw clay is generally used as a binding agent (or binder).

These raw refractory materials occupy less than 70% of the total raw refractory materials and in most cases less than 55% thereof.

Such various raw refractory materials are thoroughly mixed with suitable binder in accordance with the object and use.

Examples of binders suitable for the use in the method according to the invention are water-glass, phosphoric acid monoaluminum phosphate and/or phosphate. These are used as a chemical binder, together with a suitable amount of water and/or bonding clay. Accordingly, the admixture of raw refractory materials, admixed with binders is molded into a predetermined shape by the ordinary method and thereafter the molded product is dried at a temperature below 600° C., in which case the resulting insulating refractory product becomes unfired refractory product.

On the other hand, another suitable binder is bonding clay. However, when the binder is bonding clay alone, it will be impossible to impart a strong bonding power to the refractory product at a drying degree. Accordingly, the admixture of refractory materials, admixed with bonding clay is molded into a predetermined shape by the ordinary method and thereafter the molded product is fired so as to form ceramic bond, in which case the resulting insulating refractory product becomes fired refractory product.

In any event, the prepared admixture of refractory material is molded into a predetermined shape. For instance, an oil pressure press of 300 t. is used. A strength of molding pressure preferably above 80 kg./cm.$^2$ is used.

Respectively preferable amounts of binder and conditions of heat-treatment for unfired refractory product and fired refractory product are as follows:

| | Amount of binder (percent by weight) | Conditions of heat-treatment |
|---|---|---|
| In case of unfired refractory material | 3–10 | 150° C. to 600° C. drying. |
| In case of fired refractory material | 3–15 | 1,000° C. to 1,300° C. firing. |

The heat insulating refractory product thus produced according to the present invention is the most suitable for a furnace refractory material for cement rotary kilns. Furthermore, the said refractory product is peferably used for gas generators, heating plants for boilers, heat-treating furnaces and the like.

This invention is further described in the following examples which are illustrative but not limitative thereof.

EXAMPLE 1

The analytical values of geyserite produced at Makizono, Kagoshima Prefecture and used in this example are as follows:

Values of chemical analysis — Percent by weight
- $SiO_2$ — 92.32
- $Fe_2O_3$ — 0.19
- $TiO_2$ — 0.05
- $CaO + MgO$ — 0.29
- $Na_2 + K_2O$ — 0.14
- $B_2O_3$ — 0.20
- Ignition loss (water) — 5.94

The said geyserite is pulverized by means of ball mill and thereafter heat-treated in an electric furnace in the presence of 4.2% by weight of $K_2CO_3$. The treating temperature is 1,000° C. at its maximum and the heating time was 60 minutes.

The various properties of the said heat-treated geyserite are as follows:

Mineral composition (X-ray analysis):
  Tridimite: >70%
  Cristobalite: <30%
  Bulk density: 0.9 to 1.1

The compounding ratios or proportions (by weight) of prepared various raw materials are as follows:

| | Sample 1 | Sample 2 | Sample 3 |
|---|---|---|---|
| Heat-treated geyserite (below 200 mesh, above 80%) | 30 parts | 50 parts | 70 parts |
| Light weight chamotte (below 5 mm.) | 65 parts | 45 parts | 20 parts |
| Clay | 5 parts | 5 parts | 10 parts |
| Water glass | 6 parts | 0 part | 0 part |
| Aluminium monophosphate | 0 part | 6 parts | 0 part |
| Water | Suitable amount | Suitable amount | Suitable amount |

These components were thoroughly kneaded and thereafter treated under the following conditions:

| | Sample 1 | Sample 2 | Sample 3 |
|---|---|---|---|
| Molding pressure (kg./cm.$^2$) | 100 | 100 | 100 |
| Drying temperature and time | 200° C., 24 hours | 500° C., 24 hours | |
| Firing temperature | Unfired | Unfired | *1,300° C. |

* At the maximum.

The various properties of insulating refractory products thus obtained are as follows:

| | Sample 1 | Sample 2 | Sample 3 |
|---|---|---|---|
| Bulk density (grams/cm.$^3$) | 1.33 | 1.26 | 1.15 |
| Refractoriness Seger cone number (SK) | >31 | >31 | >31 |
| Mechanical strength [1] (kg./cm.$^2$) | 130 | 117 | 180 |
| Degree of reheat shrinkage [2] (percent): | | | |
| 1,000° C., 8 hours | 0 | 0 | 0 |
| 1,200° C., 8 hours | 0 | 0 | 0 |
| 1,300° C., 8 hours | 0.4 | 0 | 0 |

[1] Compressive strength measured according to ASTM C-133.55.
[2] The degree of reheat shrinkage was tested according to the following method:
A sample of about 50 mm. x 20 mm. x 20 mm. was taken from the said refractory product and the length ($L_0$) was measured. The sample was then placed in an electric furnace and heated at a rate of 50° C./min. Thus the sample reached a predetermined temperature and thereafter was kept at the said temperature for 8 hours. Thereafter, the sample was taken out of the furnace and cooled. The length ($L_1$) of the sample after cooling was measured.
The said degree of reheat shrinkage was the value represented by $$\frac{L_0 - L_1}{L_0} \times 100$$

It has been found that these insulating refractory products thus prepared can suitably be used in cement rotary kilns, gas generators, boiler heating plants and other heat-treating furnaces.

On the other hand, another insulating refractory product (example other than that of the present invention) is produced for trial using non-heat-treated geyserite as raw material according to the similar method.

Various properties of the refractory product thus obtained are as follows:

Mechanical strength: 20–50 kg./cm.$^2$
Degree of reheat shrinkage:
  2.7% (1,000° C., 8 hrs.)
  4.9% (1,200° C., 8 hrs.)
  5.1% (1,300° C., 8 hrs.)

The said refractory product has a small mechanical strength, a very large degree of reheat shrinkage (as described in the aforesaid Footnote 2) and lots of cracks are produced on the surface of the refractory product by heating. These refractory products cannot be used in cement rotary kilns, etc.

EXAMPLE 2

Rice hull is charged into the rotary kiln together with 2.2% by weight of $K_2CO_3$ and then fired in the state where the air could sufficiently flow into the kiln. The firing temperature is 1,000° C. at its maximum. Analytical values and bulk density of the rice hull ash obtained are as follows:

Values of chemical analysis:                Percent
    $SiO_2$ ........................................ 92.10
    $Al_2O_3$ ....................................... 0.50
    $Fe_2O_3$ ....................................... 0.19
    $TiO_2$ ......................................... 0.06
    $MgO+CaO$ ....................................... 1.08
    $Na_2O+K_2O$ .................................... 2.92
    $MnO$ ........................................... 0.12
    Others .......................................... 2.57

Mineral composition (X-ray analysis):
    Tridymite: >80
    Cristobalite: <20
Bulk density: 0.2–0.8

The compound rates of various raw materials are as follows:
And other materials such as heat-treated geyserite and the like same as those in Example 1 are used.

|  | Sample 4 | Sample 5 | Sample 6 |
|---|---|---|---|
| Heat-treated geyserite | 46 parts | 25 parts | 20 parts |
| Rice hull ash | 26 parts | 40 parts | 25 parts |
| Light weight chamotte | 18 parts | 28 parts | 45 parts |
| Clay | 10 parts | 7 parts | 10 parts |
| Water glass | 0 part | 8 parts | 0 parts |
| Aluminium monophosphate | 0 part | 0 part | 6 part |
| Water | Suitable amount | Suitable amount | Suitable amount |

These were thoroughly kneaded and treated under the following conditions:

|  | Sample 4 | Sample 5 | Sample 6 |
|---|---|---|---|
| Molding pressure (kg./cm.²) | 120 | 120 | 120 |
| Drying temperature and time | | 200° C., 24 hours | 500° C., 24 hours |
| Firing temperature | 1,300° C. | Unfired | Unfired |

The various properties of the refractory product obtained are as follows:

|  | Sample 4 | Sample 5 | Sample 6 |
|---|---|---|---|
| Bulk density (grams/cm.³) | 1.22 | 1.10 | 1.26 |
| Refractoriness (SK) | >31 | >31 | >31 |
| Mechanical strength (compressive strength) (kg./cm.²) | 185 | 115 | 130 |
| Degree of reheat shrinkage (percent): | | | |
| 1,000° C., 8 hrs | 0 | 0 | 0 |
| 1,200° C., 8 hrs | 0 | 0 | 0 |
| 1,300° C., 8 hrs | 0 | 0 | 0.3 |

On the other hand, another insulating refractory product (example other than that of the present invention) was produced for trial using rice hull ash containing not more than 50% of tridymite in silica and 4% of residual carbon due to the incomplete heat treatment. The refractory product thus obtained had numerous fine cracks, a few large cracks and was of a fragile impression. The various properties of the said refractory product were as follows:

Mechanical strength (compressive strength): 20–40 kg./cm.²
Degree of reheat shrinkage*
    1,000° C., 8 hrs.: 3.9%
    1,300° C., 8 hrs.: 5.5%

*See table footnote 2, column 6.

These refractory products can only be used for extremely limited purposes.

EXAMPLE 3

The geyserite shown in Example 1 is fired under the addition of 5% of $K_2O$ in the rotary kiln, in which case a sufficient amount of the air is introduced into the rotary kiln. The firing temperature is 1,100° C. at its maximum.

The properties of the heat-treated geyserite obtained are as follows:

Mineral composition (X-ray analysis):
    Trimydite: >85
    Cristobalite: >15
Bulk density: 0.8–1.2

The compounding ratios by weight of prepared various raw materials are as follows:

|  | Sample 7 | Sample 8 |
|---|---|---|
| The said heat-treated geyserite (more than 80% of the total amount is below 200 Me', of this 50% is below 325 Me') Me' shows Tyler mesh | 75 parts | 40 parts |
| Rice hull ash same as that shown in Example 2 | 0 part | 30 parts |
| Light weight chamotte (below 5 mm.) | 10 parts | 25 parts |
| Sillimanite | 0 part | 5 parts |
| Expanded shale | 5 parts | 0 part |
| Clay | 10 parts | 0 part |
| Water glass | 0 part | 10 parts |
| Water | Suitable amount | Suitable amount |

These were thoroughly kneaded and thereafter treated under the following conditions:

|  | Sample 7 | Sample 8 |
|---|---|---|
| Molding pressure (kg./cm.²) | 100 | 150 |
| Drying temperature and time | | 300° C., 24 hours |
| Firing temperature | 1,250° C. (Maximum) | Unfired |

The various properties of the insulating refractory products obtained are as follows:

|  | Sample 7 | Sample 8 |
|---|---|---|
| Bulk density (grams/cm.³) | 1.11 | 1.17 |
| Mechanical strength (compressive strength) (kg./cm.²) | 160 | 135 |
| Degree of reheat shrinkage* (percent): | | |
| 1,100° C., 8 hrs | 0 | 0 |
| 1,300° C., 8 hrs | 0 | 0 |

And in these refractory products no cracking was observed.

What we claim is:
1. A method for the production of heat insulating refractory products comprising the steps of: heat-treating pulverized geyserite at a temperature ranging between 500 °C. and 1200° C. in the presence of 0.3 to 7 percent by weight of an alkali material calculated as oxide selected from the group consisting of $K_2SO_4$, $K_2CO_3$, $K_2O$, $Na_2CO_3$, $Na_2SO_4$ to convert at least 60 percent of its silica content to tridymite; mixing the resulting heat-treated geyserite with light weight chamotte which is composed predominantly of 30 to 50 percent by weight of $Al_2O_3$ and 70 to 50 percent of $SiO_2$ and has a particle size below 5 millimeters, and bonding clay in such a proportion that the resulting raw refractory mixture contains 30 to 80 percent by weight of the heat-treated geyserite, 10 to 65 percent by weight of light weight chamotte, 3 to 15 percent by weight of bonding clay, as well as with a sufficient amount of water to produce a shapeable mass; molding under a pressure above 80 kg./cm.² such mixture into a predetermined shape; and firing the shaped product at a temperature of from 1000° C. to 1300° C.

2. A method for the production of heat insulating refractory products comprising the steps of heat-treating pulverized geyserite at a temperature ranging between 500° C. and 1200° C. in the presence of 0.3 to 7 percent by weight of an alkali material calculated as oxide selected from the group consisting of $K_2SO_4$, $K_2O$, $K_2CO_3$, $Na_2SO_4$, $Na_2CO_3$ to convert at least 60 percent of its silica content to tridymite; mixing the resulting heat-treated geyserite with light weight chamotte which is composed predominantly of 30 to 50 percent by weight of $Al_2O_3$ and 70 to 50 percent of $SiO_2$ and has a particle size below 5 millimeters, bonding clay, and a chemical binder selected from the group consisting of water glass, phosphoric acid, monoaluminum phosphate and monoaluminum phosphite in such a proportion that the resulting raw refractory mixture contains 30 to 80 percent by weight of the heat treated geyserite, 0 to 15 percent by weight of bonding clay, 3 to 10 percent by weight of chemical binder, as well as with a sufficient amount of water to produce a shapeable mass; molding under the pressure above 80 kg./cm.$^2$ such mixture into a predetermined shape; and drying the shaped product at a temperature of from 150° C. to 600° C.

3. A method for the production of heat insulating refractory products comprising the steps of heat-treating pulverized geyserite at a temperature ranging between 500° C. and 1200° C. in the presence of 0.3 to 7 percent by weight of an alkali material selected from the group consisting of $K_2CO_3$, $K_2O$, $K_2SO_4$, $Na_2CO_3$ and $Na_2SO_4$ to convert at least 60 percent of its silica content to tridymite; mixing the following materials:
  (1) 20 to 50 percent by weight of the resulting heat-treated geyserite, at least 80 percent of which has a particle size below 200 mesh Tyler standard screen sieve,
  (2) 20 to 45 percent by weight of the grain hull ash at least 60 percent of the silica content of which is tridymite,
  (3) 15 to 45 percent by weight of a light weight chamotte which is composed predominantly of 30 to 50 percent of $Al_2O_3$ and 70 to 30 percent of $SiO_2$ by weight and has a particle size below 5 millimeters,
  (4) 3 to 15 percent by weight of bonding clay, and
  (5) a suitable amount of water to produce a shapeable mixture;
molding the resulting raw refractory mixture under a pressure of above 80 kg./cm.$^2$ into a predetermined shape; and firing the shaped product at a temperature of from 1000° C. to 1300° C.

4. A method for the production of heat insulating refractory products comprising the steps of heat-treating pulverized geyserite at a temperature ranging between 500° C. and 1200° C. in the presence of 0.3 to 7 percent by weight of an alkali material calculated as oxide selected from the group consisting of $K_2SO_4$, $K_2CO_3$, $K_2O$, $Na_2CO_3$ and $Na_2SO_4$, whereby at least 60 percent of the silica content thereof is converted to tridymite; mixing the following materials:

(1) 20 to 50 percent by weight of the resulting heat-treated geyserite, at least 80 percent of which has a particle size below 200 mesh Tyler standard screen sieve,
  (2) 20 to 45 percent by weight of the grain hull ash at least 60 percent of the silica content of which is tridymite,
  (3) 15 to 45 percent by weight of a light weight chamotte which is composed predominantly of 30 to 50 percent of $Al_2O_3$ and 70 to 50 percent of $SiO_2$ and has a particle size below 5 millimeters,
  (4) 3 to 10 percent by weight of a chemical binder selected from the group consisting of water glass, phosphoric acid, monoaluminum phosphate and phosphite,
  (5) 0 to 10 percent by weight of bonding clay, and
  (6) a suitable amount of water to produce a shapeable mixture;
molding the resulting raw refractory mixture under a pressure of above 80 kg./cm.$^2$ into a predetermined shape; and drying the shaped product at a temperature of 150° C. to 600° C.

References Cited

UNITED STATES PATENTS

| | | | |
|---|---|---|---|
| 2,066,365 | 1/1937 | Salmang | 106—69 |
| 2,338,060 | 10/1945 | Hicks | 264(Porous Digest) |
| 2,720,462 | 10/1955 | Jones | 106—69 |
| 3,314,758 | 4/1967 | Scott et al. | 106—69 |

FOREIGN PATENTS

| | | | |
|---|---|---|---|
| 697,474 | 12/1950 | Great Britain | 106—69 |
| 825,792 | 6/1957 | Great Britain | 106—69 |
| 30,579 | 1889 | Canada | 106—69 |
| 39/6696 | 7/1964 | Japan | 106—40 |

OTHER REFERENCES

Alfred B. Searle: "An Encyclopedia of the Ceramic Industries," vol. II, 1930, p. 101.

E. H. Kraus et al.: Mineralogy, 4th edition, McGraw-Hill Book Company, Inc., New York, 1951, pp. 385 and 390–391.

JULIUS FROME, Primary Examiner

J. H. MILLER, Assistant Examiner

U.S. Cl. X.R.

106—40, 68, 69; 264—43, 56, 63